Feb. 14, 1933.  C. C. WALLACE  1,897,597

SEAL FOR STORAGE BATTERY CONTAINERS

Filed March 19, 1929

INVENTOR
Curtis C. Wallace
BY
Augustus B. Stoughton
ATTORNEY.

WITNESS:
Rob M Ketchel

Patented Feb. 14, 1933

1,897,597

UNITED STATES PATENT OFFICE

CURTIS C. WALLACE, OF PHILADELPHIA, PENNSYLVANIA

SEAL FOR STORAGE BATTERY CONTAINERS

Application filed March 19, 1929. Serial No. 348,224.

The object of this invention is to provide an improved seal between the casing or container for storage battery cells and the cover therefor.

This invention is particularly useful for casings adapted to contain a number of cells of a storage battery and in which there is a single cover for all the cells.

For a more complete exposure of my invention reference may be had to the annexed specification and drawing at the end whereof my invention will be specifically pointed out and claimed.

Figure 1:
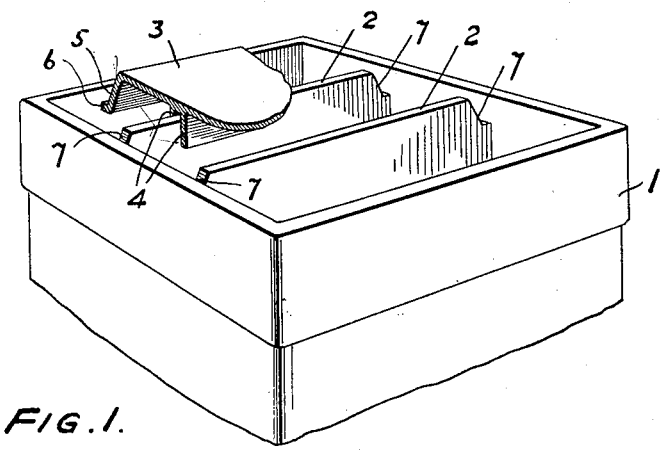
Figure 1 shows a perspective view of the upper part of a container showing the intercell walls and part of the cover for the container broken away.
Figure 2:
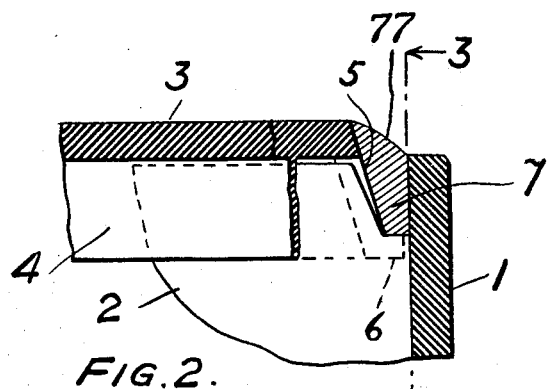
Figure 2 is a cross section through the container and the cover adjacent to one of the intercell walls.
Figure 3:
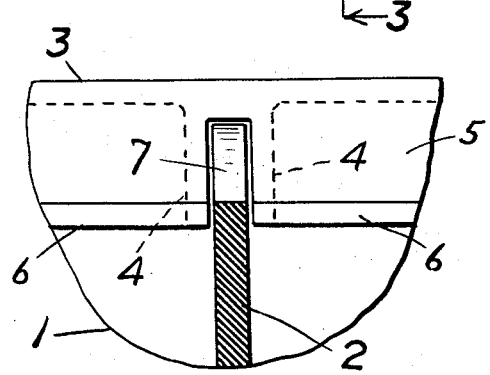
Figure 3 is a cross section at right angles to Figure 2 on the line 3—3 of Figure 2 in the direction of the arrows.

In the drawing, 1 represents a jar or casing for storage batteries. This jar or casing is divided into separate compartments, adapted to contain separate cells of a storage battery, by the intercell walls 2. Cover 3 closes the entire top of the container. The cover 3 has downwardly projecting flanges 4 adapted to receive the intercell walls between them and has at its edges downwardly projecting side walls 5 which end in a marginal lip 6 adapted to lie closely adjacent to the upper part of the inner walls of the casing 1.

At the top of the intercell walls 2 adjacent the inner walls of the casing 1 are cut notches 7 of a depth equal to the depth of the lip 6 below the top of the cover plate 3.

The side walls 5 and the lip 6 of the cover 3 and the upper edge of the inner walls of casing 1 define a trough which is adapted to contain a suitable compound 77 for sealing the cover 3 onto the casing 1. When the cover 3 has been placed upon the casing, compound is poured into this trough. The notches 7 form a part of this trough and permit a greater amount of compound to come between the casing 1 and the cover 3 than would otherwise be possible. In the prior art the intercell walls were continued at the same height from one inner wall of the casing 1 to the other. This formed barriers or partitions in the trough and a much smaller amount of compound lay between the cover 3 and the casing 1 at these points, and the area of contact for sealing was considerably reduced. These points were therefore weak spots in the fastening of the cover to the casing. By the provision of the notches 7 I have provided for a uniform amount of compound throughout the entire trough thus forming a seal of uniform strength and permanence around the entire circumference of the cover between the cover and the inner wall to the casing. This gives a stronger and more substantial container.

I claim:

1. In combination, a receptacle adapted to contain the cells of a storage battery, a cover for the receptacle having a marginal lip projecting into the mouth of the receptacle adjacent the inner side of the walls and providing a trough for sealing compound between the inner side of the walls of the receptacle and the outer walls of the cover, internal walls dividing the receptacle into separate compartments and provided with notches in unobstructed communication with the trough and adjoining the inner side of the walls of the receptacle, and compound extending continuously through said trough and said notches sealing said cover to said receptacle.

2. In combination, a receptacle adapted to contain the cells of a storage battery, a cover for the receptacle having a marginal lip projecting into the mouth of the receptacle adjacent the inner side of the walls and providing a trough for sealing compound between the inner side of the walls of the receptacle and the outer walls of the cover, internal walls dividing the receptacle into separate compartments and provided with notches adjoining the inner side of the walls of the receptacle and in unobstructed communication with said notches, and compound extending continuously through said trough and said notches sealing said cover to said receptacle.

3. An enclosing structure for a storage battery including a receptacle containing the cells of a storage battery, internal walls dividing the receptacle into separate compartments forming the cells of the storage battery, said internal walls being provided with notches adjoining the inner side of the walls of said receptacle, a cover for the receptacle having a marginal lip projecting into the mouth of the receptacle adjacent the inner side of the walls and providing a trough for sealing compound between the inner side of the walls of the receptacle and the outer walls of the cover and in unobstructed communication with said notches, internal flanges on said cover so located as to embrace the upper edge of said internal walls but to leave said notches open, and compound extending continuously through said trough and said notches sealing said cover to said receptacle.

CURTIS C. WALLACE.